US 6,546,735 B1

(12) United States Patent
Moniz et al.

(10) Patent No.: US 6,546,735 B1
(45) Date of Patent: Apr. 15, 2003

(54) METHODS AND APPARATUS FOR OPERATING TURBINE ENGINES USING ROTOR TEMPERATURE SENSORS

(75) Inventors: Thomas Moniz, Loveland, OH (US); Nicholas Damlis, Cincinnati, OH (US); Jack Willard Smith, Jr., Loveland, OH (US); Joseph Henry Schleue, West Chester, OH (US); Donald Ray Bond, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 134 days.

(21) Appl. No.: 09/801,121

(22) Filed: Mar. 7, 2001

(51) Int. Cl.[7] ............................. F02C 9/00; F04D 29/00
(52) U.S. Cl. ............................. 60/773; 60/793; 415/118
(58) Field of Search .......................... 60/773, 793, 805; 415/115, 118, 134

(56) References Cited

U.S. PATENT DOCUMENTS

| 3,788,143 A | * | 1/1974 | Gabriel | 374/144 |
|---|---|---|---|---|
| 4,730,979 A | * | 3/1988 | Hook, Jr. | 374/144 |
| 4,948,264 A | * | 8/1990 | Hook, Jr. | 374/138 |
| 5,157,914 A | * | 10/1992 | Schwarz et al. | 415/115 |
| 5,226,731 A | * | 7/1993 | Allen | 356/43 |
| 5,591,002 A | | 1/1997 | Cunha et al. | |
| 5,924,843 A | | 7/1999 | Staub et al. | |
| 6,132,174 A | | 10/2000 | Staub et al. | |
| 6,431,824 B2 | * | 8/2002 | Schotsch et al. | 374/145 |
| 6,434,473 B1 | * | 8/2002 | Hattori | 477/30 |

* cited by examiner

Primary Examiner—Charles G. Freay
(74) Attorney, Agent, or Firm—William Scott Andes; Armstrong Teasdale LLP

(57) ABSTRACT

A gas turbine engine including a temperature sensor assembly that continuously monitors an operating temperature within a multi-stage rotor assembly of the turbine engine is described. A plurality of cavities are defined within the multi-stage rotor assembly. The temperature sensor assembly includes a plurality of temperature sensor assemblies that monitor the temperature within each of the rotor assembly cavities. Each temperature sensor assembly includes a plurality of support guide tubes attached to the engine and extending from an outer casing of the engine to each cavity. A temperature sensor is inserted through the guide tubes and positioned within each cavity.

19 Claims, 3 Drawing Sheets

METHODS AND APPARATUS FOR OPERATING TURBINE ENGINES USING ROTOR TEMPERATURE SENSORS

BACKGROUND OF THE INVENTION

This application relates generally to gas turbine engines and, more particularly, to methods and apparatus for operating gas turbine engines.

Gas turbine engines typically include a high pressure rotor assembly including at least two rotor stages. Each rotor stage includes a plurality of circumferentially spaced rotor blades in flow communication with a combustion gas flowpath extending through the rotor assembly. A plurality of cavities defined within the rotor stages are radially inward from the rotor blades and the combustion gas flowpath. More specifically, these cavities are forward and aft of each rotor stage.

Power output of gas turbine engines is limited by a corrected speed of the turbine engine. More specifically, the turbine engine corrected speed limit is based on a necessity to maintain a positive pressure margin, known sometimes as a purge margin, through the rotor assembly cavities. If purge margin is not maintained through the cavities, ingestion may occur within the rotor assembly, causing an operating temperature within the cavities to increase. Over time, operating with high cavity temperatures may result in premature failure of turbo-machinery hardware.

To minimize the potential risks associated with ingestion, engine purge margins are typically pre-set by empirical methods based on historical trends. As a result of the pre-set purge margins, a maximum operating level of the gas turbine engine is limited. Furthermore, an operating capacity of the gas turbine engine is also limited.

BRIEF SUMMARY OF THE INVENTION

In an exemplary embodiment, a gas turbine engine includes a temperature sensor assembly that continuously monitors an operating temperature within cavities defined within a multi-stage rotor assembly of the turbine engine. The temperature sensor assembly includes a plurality of temperature sensor assemblies that monitor the temperature within each rotor assembly cavity. Each temperature sensor assembly includes a plurality of support guide tubes attached to the engine to extend from an outer casing of the engine to each cavity. A temperature sensor is inserted through the support guide tubes and positioned within each cavity.

During engine operation, each rotor assembly cavity receives cooling bleed air from the engine. The temperature sensor system continuously monitors the operating temperature within the cavities. A maximum power setting for the engine is determined based on the purge margin through the cavities. More specifically, the maximum power setting is determined by continuously monitoring the operating temperature within the cavities, and increasing the operating level of the engine in response to the temperature within the cavities to a point where ingestion is imminent. As a result, the gas turbine engine may be operated at a maximum power level that is determined based on the operating characteristics of the engine and not pre-set using historical data.

DETAILED DESCRIPTION OF THE INVENTION

Figure 1:
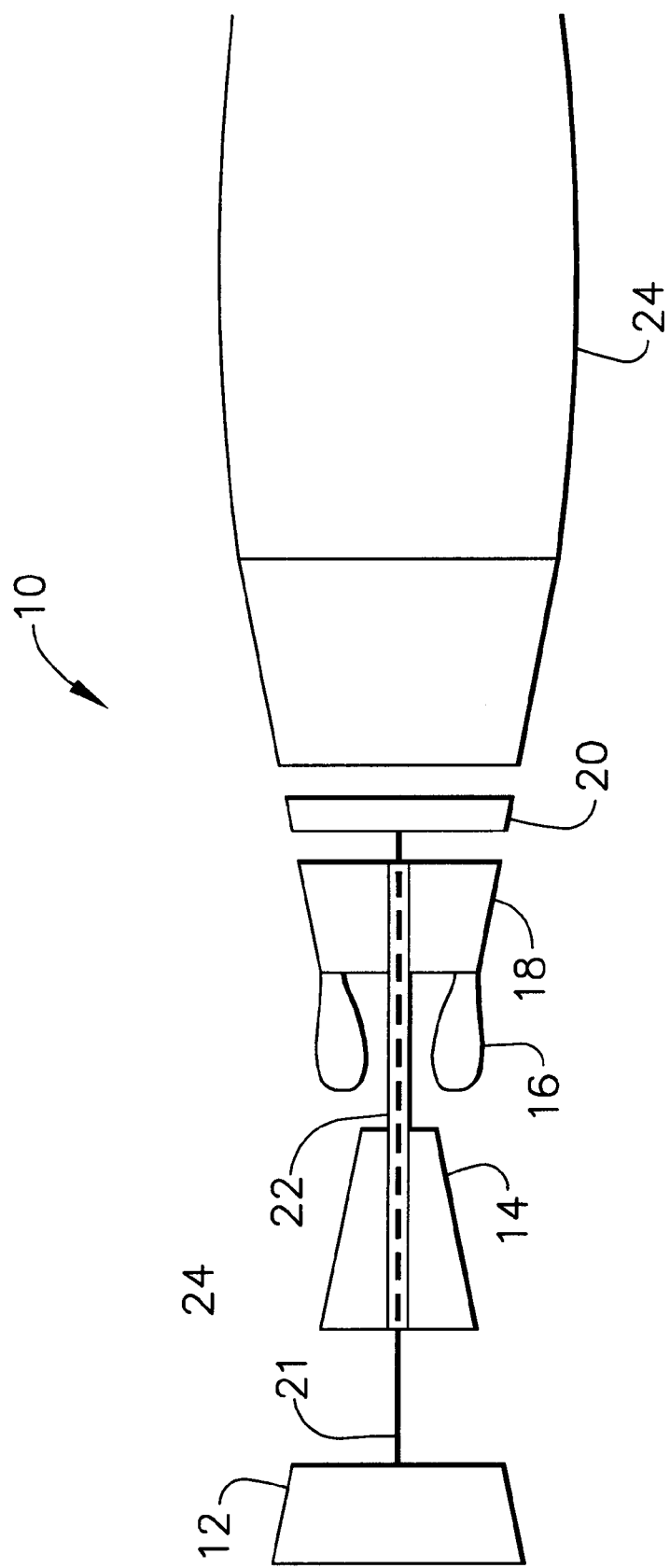
FIG. 1 a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 21, and compressor 14 and turbine 18 are coupled by a second shaft 22.

In operation, air flows through low pressure compressor 12 and compressed air is supplied from low pressure compressor 12 to high pressure compressor 14. The highly compressed air is delivered to combustor 16. Airflow (not shown in FIG. 1) from combustor 16 drives turbines 18 and 20 and exits gas turbine engine 10 through a nozzle 24.

Figure 2:
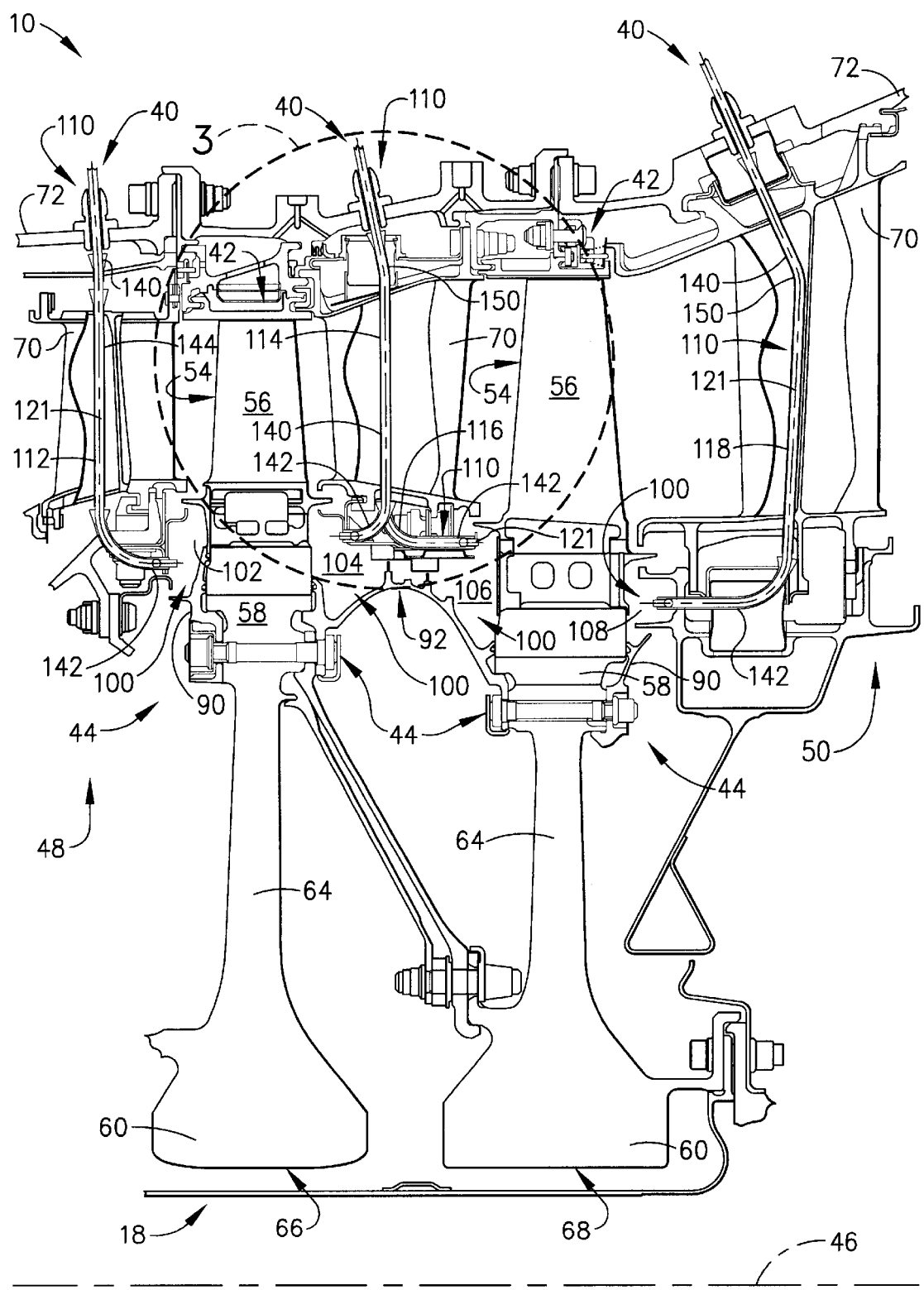
FIG. 2 a side schematic illustration of a temperature sensor system used with the gas turbine engine shown in FIG. 1.
Figure 3:
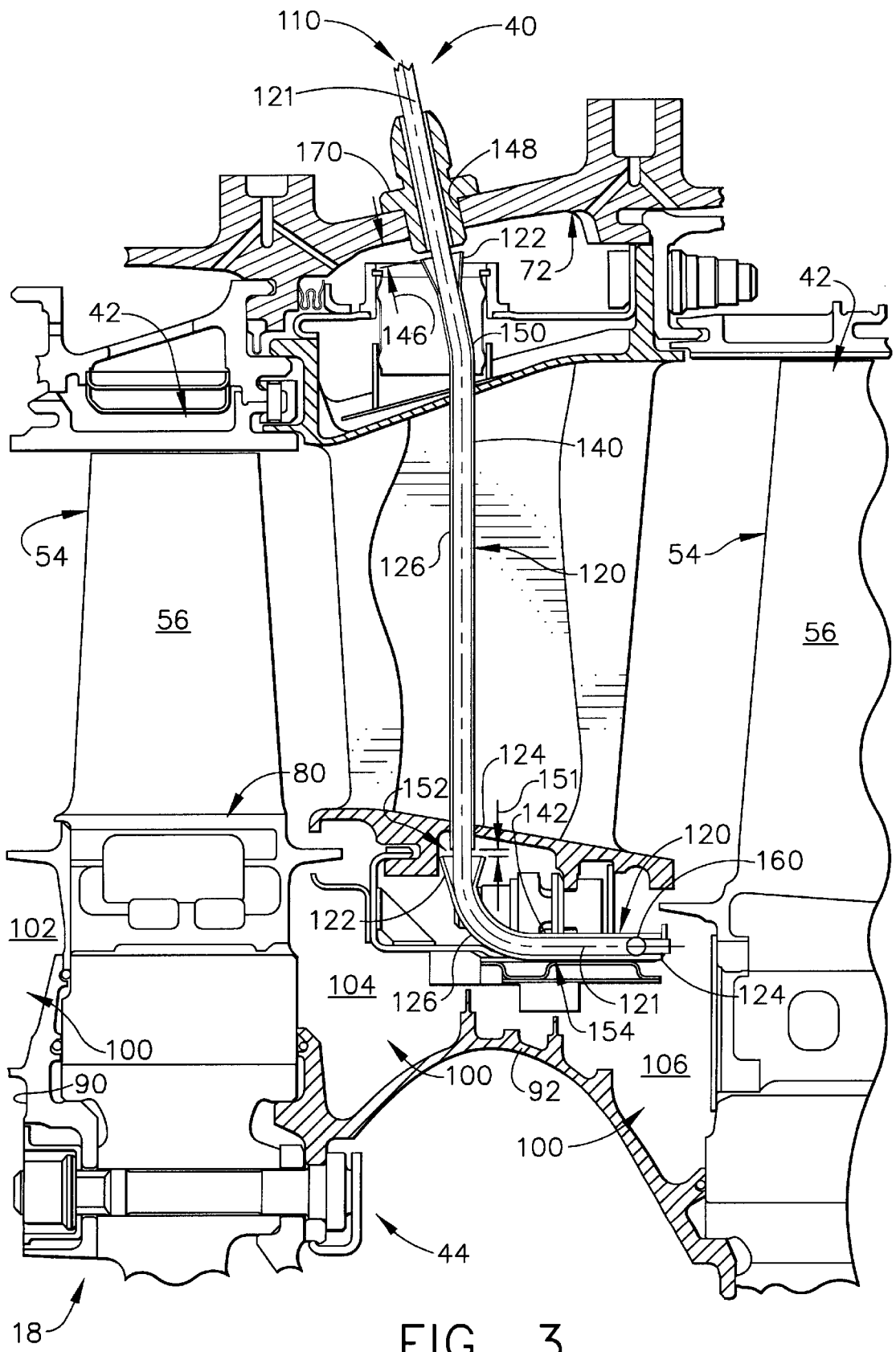
FIG. 3 is an enlarged view of a portion of the temperature sensor assembly shown in FIG. 2 taken along area 2.

FIG. 2 is a side schematic illustration of a temperature sensor system 40 used with gas turbine engine 10. FIG. 3 is an enlarged view of temperature sensor assembly 40 taken along area 3 (shown in FIG. 2). High pressure turbine 18 includes a plurality of rotors 42 coupled together with couplings 44 and coaxial with a centerline axis 46 of gas turbine engine 10. Rotors 42 extend axially along centerline axis 46 from an inlet side 48 of high pressure turbine 18 to an exhaust side 50 of high pressure turbine 18.

Each rotor 42 is formed by one or more bladed disks 54, and each bladed disk 54 includes a plurality of blades 56 extending radially outwardly from gas turbine engine centerline axis 46. Each disk 54 also includes a radially outer rim 58, a radially inner hub 60, and an integral web 64 extending therebetween. Each row of bladed disks 54 is sometimes referred to as a rotor stage. In the exemplary embodiment, high pressure turbine 18 includes more than one row of bladed disks 54 and is referred to as a multi-stage rotor. Specifically, turbine 18 includes a first rotor 66 and a second rotor 68. Turbine 18 also includes a row of circumferentially spaced apart stator vanes 70 between each pair of adjacent rotor stages of rotor blades 56. Stator vanes 70 extend from an annular outer casing 72.

Each blade 56 is integrally joined with a respective rim 58. Alternatively, each rotor blade 56 may be removably joined to rim 58 using blade dovetails (not shown) that mount in complementary slots (not shown) in each respective rim 58. Blades 56 extend circumferentially around rotor assembly 18 and extract energy from a motive or working fluid, such as air, as the motive fluid flows through turbine 18. As blades 56 rotate, centrifugal loads are generated and are carried by portions of rims 58 beneath each blade 56. Additionally, outer surfaces 80 of rotor rims 58 define a radially inner surface of a combustion gas flowpath of rotor assembly 18. Each web 64 extends between each rotor radially outer rim 58 and rotor radially inner hub 60.

A sealing assembly 90 attaches to each disk 54. More specifically, each assembly 90 couples to each rotor 66 and 68 and includes a bridging portion 92 which extends between rotors 66 and 68. Seal assembly 90 is spaced radially inward of corresponding rims 58 such that plurality of cavities 100 are defined within rotor assembly 18 and are radially outward from sealing assembly 90. Cavities 100 are sometimes referred to as wheelspace cavities.

Cavities 100 are radially inward from rotor blades 56. A first rotor forward cavity 102 is defined upstream from first rotor 66, a first rotor aft cavity 104 is defined downstream from first rotor 66, a second rotor forward cavity 106 is defined upstream from second rotor 68, and a second rotor aft cavity 108 is defined downstream from second rotor 68. Second rotor forward cavity 106 is between first rotor aft cavity 104 and second rotor 68.

Each cavity, 102, 104, 106, and 108 is in flow communication with an engine bleed air system (not shown) to receive bleed air during engine operation. Each cavity 102, 104, 106, and 108 is also in flow communication with temperature sensor system 40.

Temperature sensor system 40 includes a plurality of substantially similar temperature sensor assemblies 110. Each temperature sensor assembly 110 extends from turbine outer casing 72 radially inward to a respective cavity 102, 104, 106, and 108. Specifically, a first rotor forward temperature assembly 112 extends into cavity 102, a first rotor aft temperature assembly 114 extends into cavity 104, a second rotor forward temperature assembly 116 extends into cavity 106, and a second rotor aft temperature assembly 118 extends into cavity 108.

Each temperature sensor assembly 110 includes a plurality of support guide tubes 120 and a temperature sensor 121. In one embodiment, temperature sensor 121 is a thermocouple. Support guide tubes 120 are hollow and in the exemplary embodiment have a substantially circular cross-sectional profile. In another embodiment, support guide tubes 120 have a non-circular cross-sectional profile. In a further embodiment, support guide tubes 120 are perforated.

Each support guide tube 120 includes a first end 122, a second end 124, and a body 126 extending therebetween. Each support guide tube first end 122 is outwardly-flared such that a diameter (not shown) of each support guide tube first end 122 is larger than a diameter (not shown) of support guide tube second end 124. The support guide tube second end diameter is substantially constant along support guide tube body 126. When attached within engine 10, each support guide tube first end 122 is radially outward from each support guide tube second end 124.

Each temperature sensor assembly 110 includes at least two support guide tubes 120. Specifically, each assembly 110 includes at least a radially outer guide tube 140 and a radially inner guide tube 142. First rotor forward temperature assembly 112 includes an additional guide tube 144 positioned between tubes 140 and 142.

Each radially outer guide tube 140 is secured within rotor assembly 18 such that each support guide tube first end 122 is concentrically aligned a distance 146 from a respective opening 148 in outer casing 72. Each support guide tube body 126 extends radially inward through hollow stator vanes 70 towards engine centerline axis 46. More specifically, support guide tube bodies 126 may include elbows 150 to align each support guide tube 120 substantially perpendicularly to engine centerline axis 46 radially inward from elbows 150.

Each radially inner guide tube 142 and any additional guide tubes 144 is attached to engine 10 such that each tube 142 is aligned substantially concentrically with respect to each respective radially outer guide tube 140. More specifically, each tube 142 and 144 is secured to engine 10 such that a first end 122 of each tube 142 and 144 is a distance 151 from a corresponding second end 124 of a radially outwardly attached support guide tube 120, such that a gap 152 is created between adjacent support guide tubes 120.

Radially inner guide tube bodies 126 are curved such that a portion 154 of each radially inner guide tube 142 is substantially parallel to engine centerline axis 46. Each radially inner guide tube 142 positions each radially inner guide tube second end 124 within a respective cavity 100. A stop 160 is positioned adjacent each radially inner guide tube second end 124 within each cavity 100.

Temperature sensors 121 are housed within support guide tubes 120 and extend through support guide tubes 120 to be positioned in alignment with respect to a respective cavity 100 with stops 160. Each temperature sensor assembly 110 is removably coupled to engine outer casing 72 with a fitting and a nut assembly 170. Accordingly, temperature sensors 121 are removable from temperature sensor assembly 110 without disassembly of engine 10 and externally from engine 10.

During assembly of engine 10, temperature sensor system 40 is secured within rotor assembly 18. More specifically, temperature sensor assembly support guide tubes 120 are secured to engine 10, as described above, and extends from engine outer casing 72 radially inward to cavities 100. Temperature sensor 121 is inserted through an outer casing opening 148 and extends a distance 146 from outer casing 72 into radially outer guide tube 140. Because radially outer guide tube first end 122 is outwardly flared, temperature sensor 121 is captured within radially outer guide tube 140 and routed towards a subsequent guide tube 120.

As temperature sensor 121 is inserted through radially outer guide tube 140, sensor 121 is extended through gap 152 and is captured by an outwardly flared first end 122 of an adjacent guide tube 120. In the exemplary embodiment shown in FIG. 3, temperature sensor 121 is inserted through radially outer guide tube 140 and through gap 152 before entering radially inner guide tube 142.

Temperature sensor 121 is then inserted to contact guide tube stop 160. Stop 160 ensures temperature sensor 121 is positioned in alignment with respect to second rotor forward cavity 106. After sensor 121 is seated against stop 160, sensor 121 is secured to engine 10 with fitting and nut assembly 170.

Over time, if temperature sensor 121 needs to be replaced, fitting and nut assembly 170 is loosened and temperature sensor 121 is removed from engine 10. A new temperature sensor 121 may then be inserted as described above. Guide tubes 120 ensure temperature sensor 121 is properly routed through rotor assembly 18 to a respective cavity 100.

During engine operation, cavities 100 receive cooling bleed air from the bleed air system. The bleed air system provides bleed air to maintain a positive pressure margin, known as purge margin, from cavities 100. Guide tubes 120 have relatively small cross-sectional profiles to facilitate reducing blockage of cooling air supplied to cavities 100. In one embodiment, guide tubes 120 are perforated to further facilitate reducing blockage of cooling air.

As engine 10 operates, temperature sensor system 40 is used to monitor a temperature within cavities 100. More specifically, temperature sensor 121 continuously senses the temperature within cavities 100 and transmits the temperature to a monitoring source (not shown) that is external to engine 10.

A maximum power setting for engine 10 is determined based on purge margin through cavities 100. More specifically, the engine maximum power setting is determined as a result of continuous temperature monitoring within cavities 100, such that engine 10 is operated at a maximum power setting where ingestion, i.e., zero-percent purge margin, is imminent. Engine 10 is increased in operating speed until ingestion is sensed within cavities 100. A sudden increase in temperature, known as a spike, within cavities 100 is indicative of ingestion and the power setting of engine 10 is decreased accordingly.

Furthermore, during engine operation, because guide tube first ends 122 are outwardly flared, guide tubes 120 facilitate reducing potential stresses induced to temperature sensor 121 as a result of mechanical motion or thermal growth. In addition, guide tube first ends 122 facilitate reducing stresses induced to temperature sensor 121 across gaps 152 as a result of misalignment between adjacent guide tubes 120.

The above-described temperature sensor system for a gas turbine engine is cost-effective and reliable. The temperature sensor system includes a plurality of temperature sensor assemblies that extend radially inward through a rotor assembly to each engine wheelspace cavity. More specifically, each temperature sensor assembly includes a plurality of support guide tubes that position a temperature sensor in proper alignment within each wheelspace cavity, such that a temperature of each cavity is continuously monitored. As a result, a max power setting for the engine is determined and adjusted in response to the temperature within the cavities.

While the invention has been described in terms of various specific embodiments, those skilled in the art will recognize that the invention can be practiced with modification within the spirit and scope of the claims.

What is claimed is:

1. A method for operating a gas turbine engine including a rotor assembly and at least one cavity defined within the rotor assembly, said method comprising the steps of:

monitoring a temperature within the rotor assembly cavity during operation of the gas turbine engine; and adjusting an operating power level of the engine in accordance with the temperature within the cavity.

2. A method in accordance with claim 1 wherein said step of monitoring a temperature further comprises the step of detecting a temperature within the rotor assembly cavity with a temperature sensor assembly that includes a support system and a temperature sensor within the support system.

3. A method in accordance with claim 1 wherein said step of monitoring a temperature further comprises the step of detecting a temperature within the rotor assembly cavity with a temperature sensor that is removably coupled to the engine.

4. A method in accordance with claim 1 wherein said step of adjusting an operating power level further comprises the step of decreasing an operating power level of the engine when a sudden temperature increase within the rotor assembly cavity is detected.

5. A method in accordance with claim 1 wherein said step of adjusting an operating power level further comprises the step of adjusting an operating power level of the engine to facilitate maintaining a positive pressure margin within the rotor assembly cavity.

6. A temperature sensor assembly for a gas turbine engine including a multi-stage rotor assembly and at least one cavity defined within the rotor assembly, said temperature assembly comprising:

a support system extending radially inward through the gas turbine engine; and a temperature sensor inserted through said support system, and configured to detect a temperature within the turbine rotor assembly cavity, said support system comprising a stop configured to position said temperature sensor relative to turbine rotor assembly cavity.

7. A temperature sensor assembly in accordance with claim 6 wherein said support system comprises a plurality of tubes.

8. A temperature sensor assembly in accordance with claim 7 wherein each of said support system tubes comprises a first end and a second end, at least one of said tube first end and said tube second end is outwardly flared.

9. A temperature sensor assembly in accordance with claim 7 wherein each of said support system tubes is perforated.

10. A temperature sensor assembly in accordance with claim 6 wherein said support system is configured to guide said temperature sensor to the turbine rotor assembly cavity.

11. A gas turbine engine comprising:

a multi-stage rotor assembly comprising at least one cavity defined therein; and a temperature sensor assembly configured to detect a temperature within said rotor assembly cavity, an operating power level of said engine adjusted in accordance with the temperature sensed within said rotor assembly cavity.

12. A gas turbine engine in accordance with claim 11 wherein said temperature assembly comprises:

a support system attached to said gas turbine engine to extend radially inward through said rotor assembly to said rotor assembly cavity; and a sensor inserted through said support system and configured to detect a temperature within said rotor assembly cavity.

13. A gas turbine engine in accordance with claim 12 wherein said temperature assembly support system comprises a plurality of tubes.

14. A gas turbine engine in accordance with claim 13 wherein each of said temperature assembly support system tubes comprises a first end and a second end, at least one of said tube first and said second ends outwardly flared.

15. A gas turbine engine in accordance with claim 13 wherein each of said temperature assembly support system tubes is perforated.

16. A gas turbine engine in accordance with claim 13 wherein adjacent said temperature assembly support system tubes are substantially concentrically aligned.

17. A gas turbine engine in accordance with claim 13 wherein said temperature assembly support system is configured to guide said sensor to said rotor assembly cavity.

18. A gas turbine engine in accordance with claim 13 wherein said temperature assembly support system tube comprises a stop configured to position said sensor relative to said rotor assembly cavity.

19. A gas turbine engine in accordance with claim 13 wherein said rotor assembly comprises four cavities, said temperature sensor assembly configured to detect a temperature within at least one of said rotor assembly cavities.

\* \* \* \* \*